(12) United States Patent
Larsen et al.

(10) Patent No.: US 11,542,441 B2
(45) Date of Patent: Jan. 3, 2023

(54) FCC YIELD SELECTIVITY IMPROVEMENTS IN HIGH CONTAINMENT RISER TERMINATION SYSTEMS

(71) Applicant: MARATHON PETROLEUM COMPANY LP, Findlay, OH (US)

(72) Inventors: Nikolas Larsen, Findlay, OH (US); Jeff Sexton, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 17/384,139

(22) Filed: Jul. 23, 2021

(65) Prior Publication Data

US 2021/0348067 A1      Nov. 11, 2021

Related U.S. Application Data

(63) Continuation of application No. 16/736,661, filed on Jan. 7, 2020, now Pat. No. 11,098,255, which is a continuation of application No. 15/833,107, filed on Dec. 6, 2017, now Pat. No. 10,526,547.

(60) Provisional application No. 62/430,512, filed on Dec. 6, 2016.

(51) Int. Cl.
*B01J 8/34*     (2006.01)
*C10G 11/20*    (2006.01)
*B01J 8/00*     (2006.01)
*B01J 8/18*     (2006.01)

(52) U.S. Cl.
CPC .............. *C10G 11/20* (2013.01); *B01J 8/008* (2013.01); *B01J 8/0025* (2013.01); *B01J 8/0055* (2013.01); *B01J 8/1872* (2013.01); *B01J 8/34* (2013.01); *B01J 2208/0061* (2013.01); *B01J 2208/00557* (2013.01); *B01J 2208/00929* (2013.01); *B01J 2219/00763* (2013.01)

(58) Field of Classification Search
CPC . B01J 8/0025; B01J 8/1872; B01J 8/34; B01J 2208/00929; B01J 2208/0061; B01J 2219/00763; B01J 2219/00765
See application file for complete search history.

(56) References Cited

U.S. PATENT DOCUMENTS

| | | | |
|---|---|---|---|
| 3,188,184 A * | 6/1965 | Rice .................. | C10G 11/18 208/78 |
| 3,928,172 A * | 12/1975 | Davis, Jr. ............ | C10G 11/18 502/67 |
| 4,404,095 A * | 9/1983 | Haddad .................... | B01J 8/005 208/164 |
| 5,034,115 A | 7/1991 | Avidan | |
| 5,139,649 A | 8/1992 | Owen et al. | |
| 5,858,207 A | 1/1999 | Lomas | |
| 6,063,263 A | 5/2000 | Palmas | |
| 6,503,460 B1 | 1/2003 | Miller et al. | |
| 6,841,133 B2 | 1/2005 | Niewiedzial et al. | |
| 7,914,601 B2 | 3/2011 | Mehlberg | |
| 10,526,547 B2 | 1/2020 | Larsen et al. | |
| 2021/0002559 A1 | 1/2021 | Larsen et al. | |

* cited by examiner

*Primary Examiner* — Randy Boyer
(74) *Attorney, Agent, or Firm* — Womble Bond Dickinson (US) LLP

(57) ABSTRACT

The invention provides an improved system for separation technology intended to reduce unwanted catalyst/thermal reactions by minimizing contact of the hydrocarbons and the catalyst within the reactor.

20 Claims, 17 Drawing Sheets

TRIAL RUN #1

| Reactor Level | 180 | 170 | 160 | 150 | 140 | 130 |
|---|---|---|---|---|---|---|
| Dry Gas, FOE lv% | 1.94 | 1.85 | 1.75 | 1.75 | 1.70 | 1.70 |
| C3=, lv% | 8.46 | 8.29 | 8.33 | 8.13 | 8.47 | 8.42 |
| C3, lv% | 2.63 | 2.68 | 2.64 | 2.58 | 2.57 | 2.56 |
| iC4, lv% | 8.21 | 8.52 | 8.91 | 8.71 | 8.62 | 8.57 |
| iC4=, lv% | 1.62 | 1.65 | 1.61 | 1.57 | 1.55 | 1.54 |
| Total C4= | 8.40 | 8.63 | 8.60 | 8.41 | 8.37 | 8.32 |
| HCN | 66.88 | 66.59 | 67.62 | 68.48 | 68.13 | 68.52 |
| LCO | 14.59 | 14.53 | 13.66 | 13.59 | 13.73 | 13.72 |
| Slurry | 2.86 | 2.86 | 2.67 | 2.54 | 2.72 | 2.59 |

TRIAL RUN #2

| Reactor Level | 160 | 150 | 140 | 130 |
|---|---|---|---|---|
| Dry Gas, FOE lv% | 2.42 | 2.25 | 2.34 | 2.26 |
| C3=, lv% | 9.92 | 9.45 | 9.32 | 9.34 |
| C3, lv% | 3.08 | 2.96 | 2.92 | 2.89 |
| iC4, lv% | 9.09 | 9.43 | 9.29 | 9.36 |
| iC4=, lv% | 1.57 | 1.60 | 1.58 | 1.65 |
| Total C4= | 8.58 | 8.89 | 8.76 | 9.07 |
| HCN | 66.31 | 67.26 | 67.04 | 66.51 |
| LCO | 11.98 | 11.71 | 11.90 | 11.91 |
| Slurry | 2.83 | 2.67 | 2.76 | 2.97 |

FIG 5

| Yields | ΔYield: 26%-28% Rx Level | ΔYield: 26%-28% Rx Level |
|---|---|---|
| Total Off Gas | (0.03) | (0.02) |
| Propylene, C3= | 0.28 | 0.17 |
| n-Butane, NC4 | 0.07 | 0.05 |
| Light Cat Naphtha | 1.24 | 1.11 |
| Light Cycle Oil | (0.66) | (0.61) |

FIG 8

FCC YIELD SELECTIVITY IMPROVEMENTS IN HIGH CONTAINMENT RISER TERMINATION SYSTEMS

CROSS REFERENCE TO RELATED APPLICATION

This application is a divisional of U.S. Non-Provisional application Ser. No. 16/736,661, filed Jan. 7, 2020, titled "FCC YIELD SELECTIVITY IMPROVEMENTS IN HIGH CONTAINMENT RISER TERMINATION SYSTEMS," which is a continuation of U.S. Non-Provisional application Ser. No. 15/833,107, filed Dec. 6, 2017, titled "FCC YIELD SELECTIVITY IMPROVEMENTS IN HIGH CONTAINMENT RISER TERMINATION SYSTEMS," now U.S. Pat. No. 10,526,547, issued Jan. 7, 2020, which claims the benefit of U.S. Provisional Application No. 62/430,512, filed Dec. 6, 2016, titled "FCC YIELD SELECTIVITY IMPROVEMENTS IN HIGH CONTAINMENT RISER TERMINATION SYSTEMS," all of which are incorporated herein by reference in their entireties.

BACKGROUND OF THE INVENTION

Fluidic catalytic cracker (FCC) reactor technology has evolved over the years, continuously searching to improve yield selectivity of hydrocarbons by minimizing unwanted reactions that occur outside of the FCC riser. Most FCC reactors use a catalyst which is an extremely porous powder that reacts with the hydrocarbon mixture to capture inter-metal carbon and metal. In the process, the pre-heated hydrocarbon feed mixed with hot catalyst enters the reactor through one or more risers. The riser creates a fluidized bed where a concurrent upward flow of reactant gases and catalyst particles occurs. Nearly every FCC unit employs some type of separation device connected on the end of the riser which is intended to separate the bulk of the catalyst from the hydrocarbon vapors. The technology includes riser termination devices which range from providing a physical downward deflection of the catalyst as it exits the riser to directly attaching the riser outlet to sets of cyclones. The most commonly used separation devices are vortex separation systems (VSS) and vortex disengager stripper systems (VDS). The vortex separation system includes a tube with a split head located at the riser outlet to separate the mixture. The VDS system has a stripping unit at the bottom of a rough vortex evaporation system and usually forms two stage stripping.

Gases leave the reactor through the cyclones after separation from the powdered catalyst. The gas is then passed to a fractionator for separation into the product streams. The spent catalyst is commonly sent to a regenerator unit and is regenerated by combusting carbon deposits to carbon dioxide. The regenerated catalyst is returned to the reactor for further use. Separation of the gases from the catalyst is seldom totally efficient, whereas gases and catalyst may tend to recirculate in the separation device creating conditions resulting in over cracked gases and over fouling of the catalyst. The present invention provides an improved system for the VSS/VDS technology intended to reduce unwanted catalytic/thermal reactions by minimizing contact of the hydrocarbons and the catalyst outside of the riser.

SUMMARY OF THE INVENTION

This invention reduces the amount of undesired thermal and catalytic reactions occurring in FCC reactors having high containment separation systems such as the VSS/VDS. The undesired reactions are exacerbated by hydrocarbon underflow in the separation system, resulting in increased residence time between the hydrocarbon vapors and the catalyst. It is desirable to limit the time during which the hydrocarbon vapors and catalysts are intermixed. The longer the mixing time, the more potential for lower hydrocarbon yields and greater catalyst fouling. If the catalyst is too fully entrained with hydrocarbon vapors as it exits the riser and enters the separation technology, the hydrocarbon vapor will not cleanly separate from the catalyst and will carry under with the catalyst resulting in hydrocarbon underflow to the catalyst bed, leading to unwanted thermal and catalytic reactions. The present invention mitigates these unwanted reactions and improves FCC yield by minimizing hydrocarbon underflow into the separation system. In essence, the bottom of the separation system sits in a catalyst bed that prevents hydrocarbon vapor from remixing with the catalyst in the separation system. Vent tubes provide an exit path for the hydrocarbon vapor exiting the stripper to bypass the separation system and exit the reactor via the cyclones.

The cyclone operations must be carefully monitored to ensure that cyclone inlet hydrocarbons are not dragged downward by the catalytic solids. Historically, increasing the amount of catalyst inventory contained in the reaction prevents such under flow or back flow of hydrocarbon gases. However, the structures of the present invention create an environment wherein increased hydrocarbon gas yield can be associated with lesser catalyst inventory, less catalyst entrainment into the separation system and less resultant hydrocarbon underflow.

The structure of the present invention and a resulting use of decreased catalyst inventory produces efficient FCC operations with less consumed energy.

IN THE DRAWINGS

FIG. 5 shows the results of two test runs of the present invention.

FIGS. 7*a-i* are product yield graphs at varying catalyst bed levels in the reactor for the test runs of FIG. 5.

FIG. 8 shows the results of a third test run of the present invention on another FCC reactor at a different location.

Figure 9:
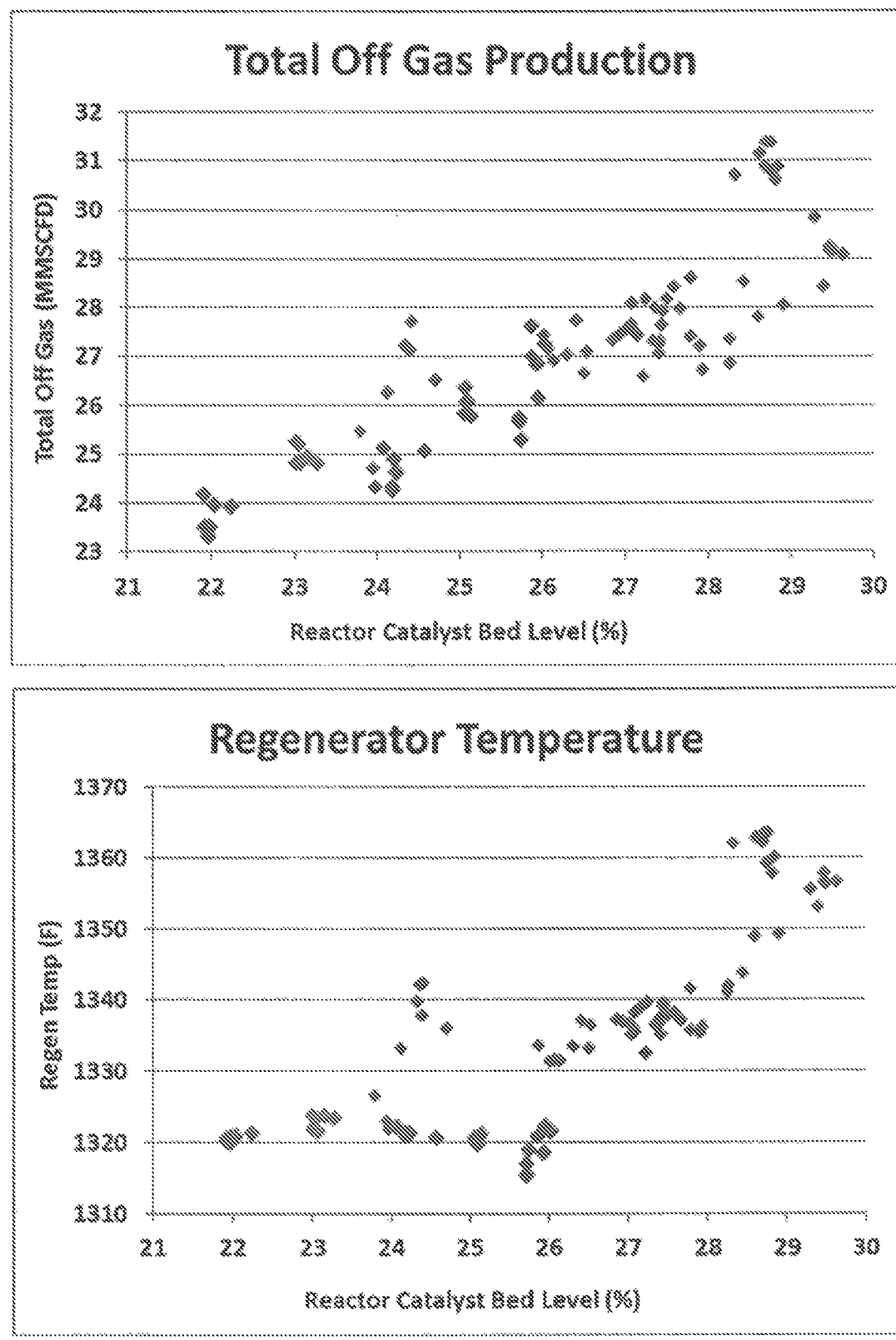

FIG. 9 shows the dry gas and regenerator temperature shifts at varying catalyst bed levels for the test of FIG. 8.

DETAILED DESCRIPTION OF THE PRESENT INVENTION

Figure 1:
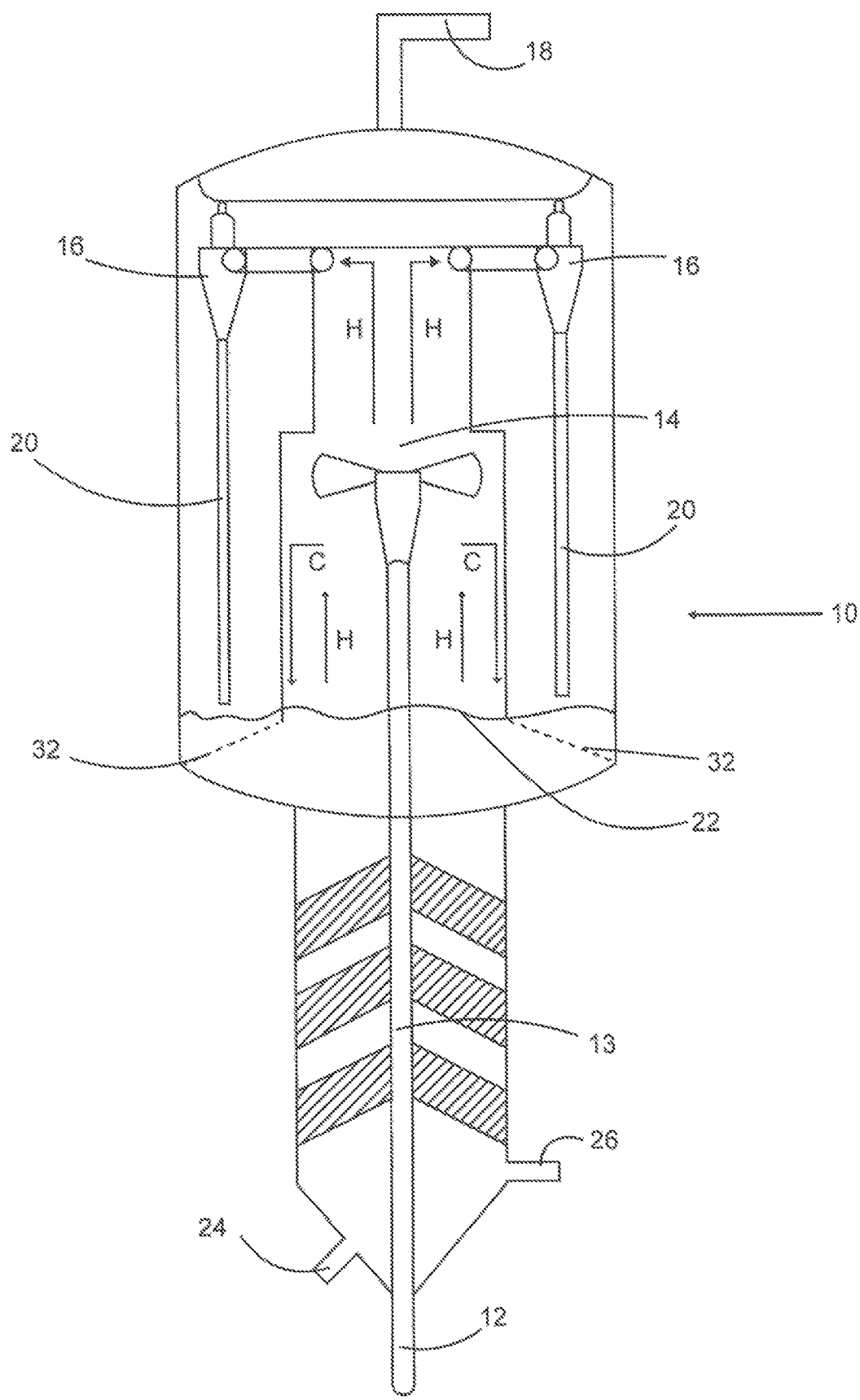
FIG. 1 is a schematic of a FCC reactor incorporating a first embodiment of the present invention.

Referring now to FIG. 1, a schematic depicting a FCC reactor incorporating a first embodiment of the invention is shown having a lowered fluidized catalyst bed 22 maintained just above the windows 32 of the separator or VSS 14. The reactor 10 includes an inlet 12 for receiving a mixture of heated crude oil and heated catalyst. The crude and catalyst mixture travels up the riser 13 during which the catalyst and crude interact and the catalyst absorbs carbon, metals, and other deleterious materials not wanted in the hydrocarbon gases. As the entrained hydrocarbon/catalyst mixture exits the riser and enters the separator 14 the catalyst will fall downward through the separator 14 while the clean hydrocarbon stream continues to rise where it is received by cyclones 16 which serve to further separate any remaining catalyst from the hydrocarbon stream. The cleansed hydrocarbon stream then exits the reactor through outlet 18 to be transferred to separation equipment, such as a fractionator. The separated catalyst located in the cyclone flows down the dipleg 20 and is reentered into the catalyst bed 22. Any hydrocarbon gases that become entrained with the falling catalyst will reenter the fluidized catalyst bed 22 for further separation and those gases will flow upwardly as shown by flow arrows H. The catalyst bed 22 is fluidized by high pressure steam being injected in the reactor 10 through steam inlet 26. The spent catalyst will exit the reactor at exit 24 and, most commonly, will be sent to a regenerator for cleansing. The regenerated catalyst is then reentered with the crude mixture at inlet 12.

The hydrocarbon gases that become entrained with the falling catalyst enter the fluidized catalyst bed and are processed until they become cleansed hydrocarbon gases. The cleansed hydrocarbon gases will rise through the separator and will be captured by the cyclones 16.

In the prior art at FCC units, not shown, there is a common effect at the lower level of the separator 14, wherein the hydrocarbon gases and catalyst recirculate above the fluidized bed 22. This recirculation creates an inefficiency in the operation of the reactor as the catalyst and hydrocarbons continue to react, resulting in decreased hydrocarbon yield and increased catalyst fouling. Increased catalyst fouling leads to increased heat expenditure when the catalyst is sent to the regenerator for cleansing. Increased regenerator temperatures create inefficiencies in the operation of the system. The present invention seeks to solve the catalyst/hydrocarbon recirculation issues in the lower portion of the separator 14.

In the prior art, not shown, the fluidized bed 22 was maintained well above the top of the separator windows 32, preferably at 180 inches water column ("IWC"). In the FIG. 1 embodiment the fluidized bed has been lowered to approximately 150 IWC and yield has been improved as exhibited in FIGS. 4-9.

Figure 3:
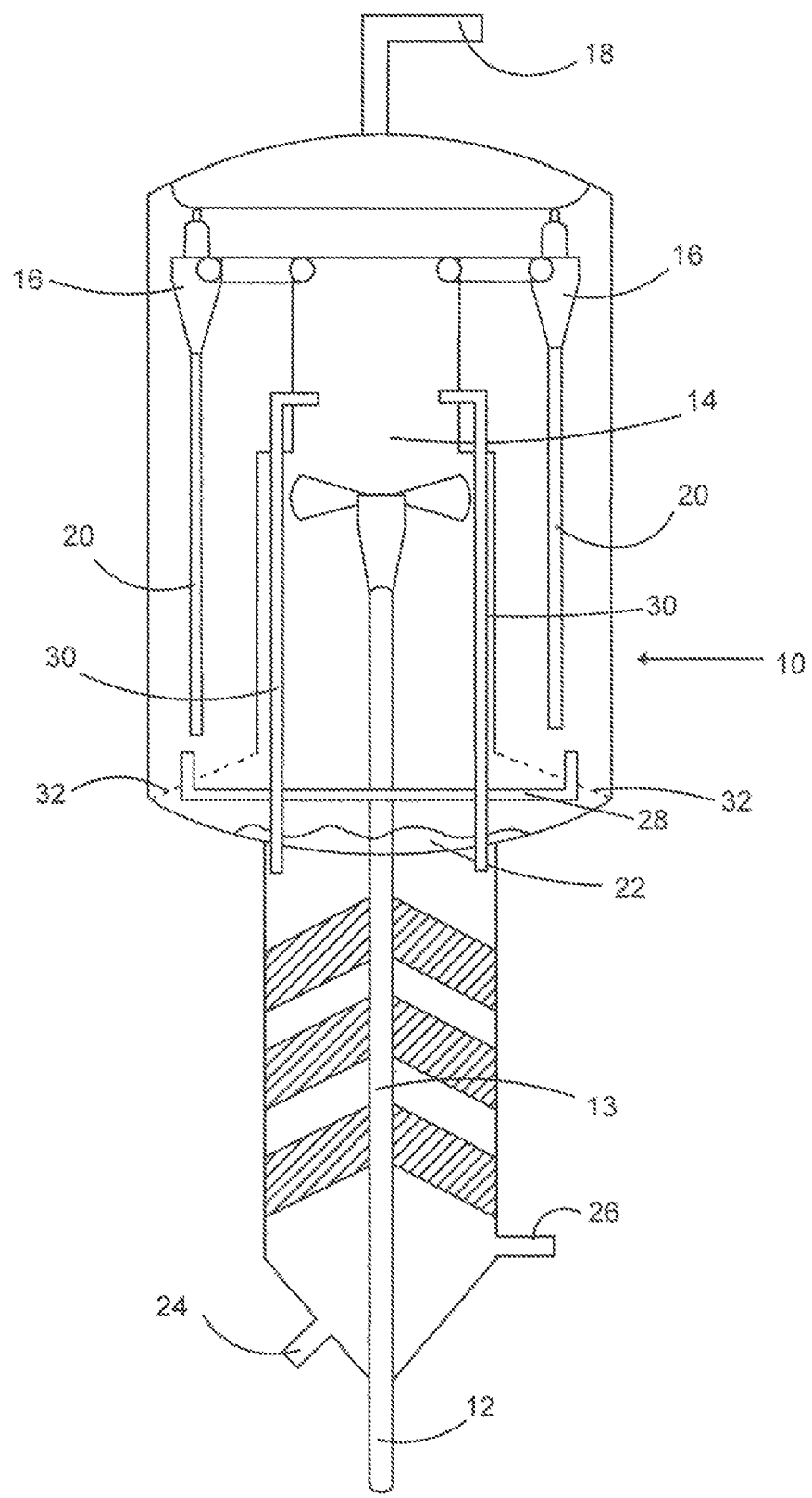
FIG. 3 is a schematic of a FCC reactor incorporating yet another embodiment of the present invention.
Figure 4:
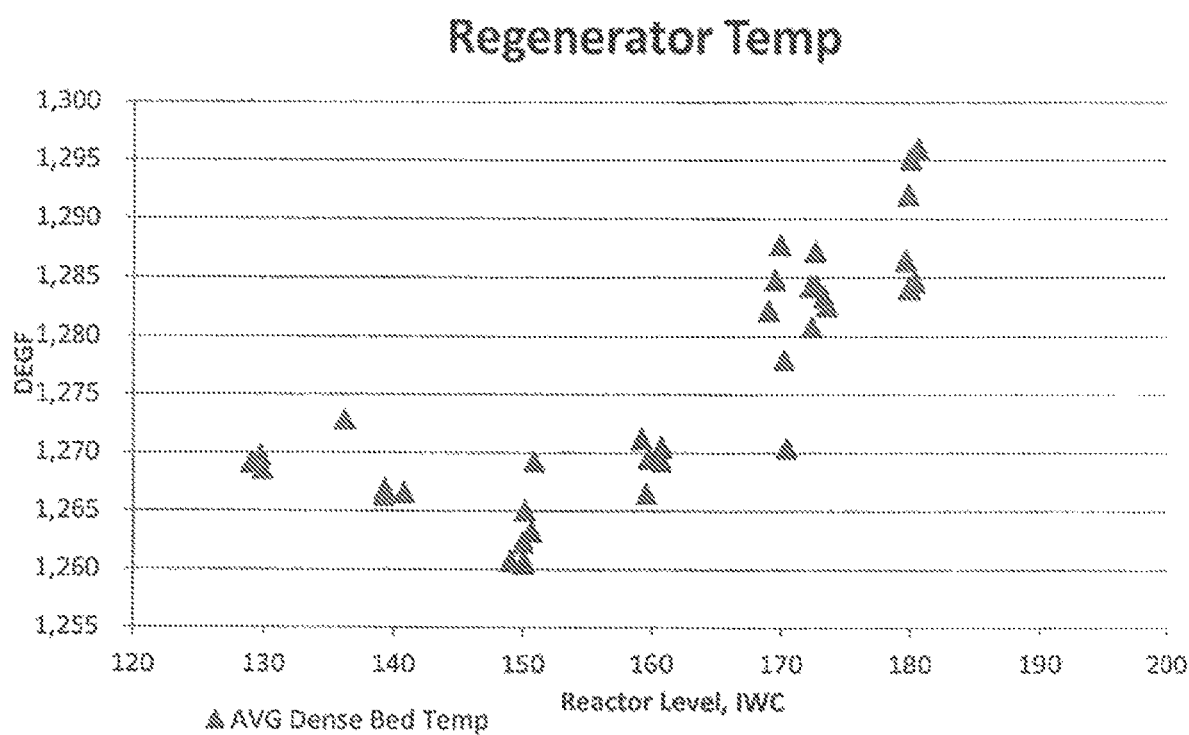
FIG. 4 is a graphical representation of catalyst temperature response to decreased catalyst levels in the reactor.

The reactor of FIG. 1 is shown having the top level of the catalyst bed 22 located directly above the windows 32 of the separator 14. Referring to FIG. 3, it can be seen that when the catalyst bed level in the reactor ranges between 130 and 160 IWC or directly above the separator 14 windows 32, the catalyst temperature being delivered from the regenerator is much lower, resulting in higher efficiencies.

Referring now to FIG. 5, the yield results from two test runs of the present invention on the same FCC reactor, for the various products produced by the catalytic cracking are shown. The yield plots on the tables show total hydrocarbon production increasing or remaining stable as the result of decreased overall cracking due to the lower bed levels for the catalyst. Delta coke is also decreased indicating more valuable product being recovered. Due to increased product recovery and decreased over cracking, the reactor operations are made more efficient.

Figure 6:
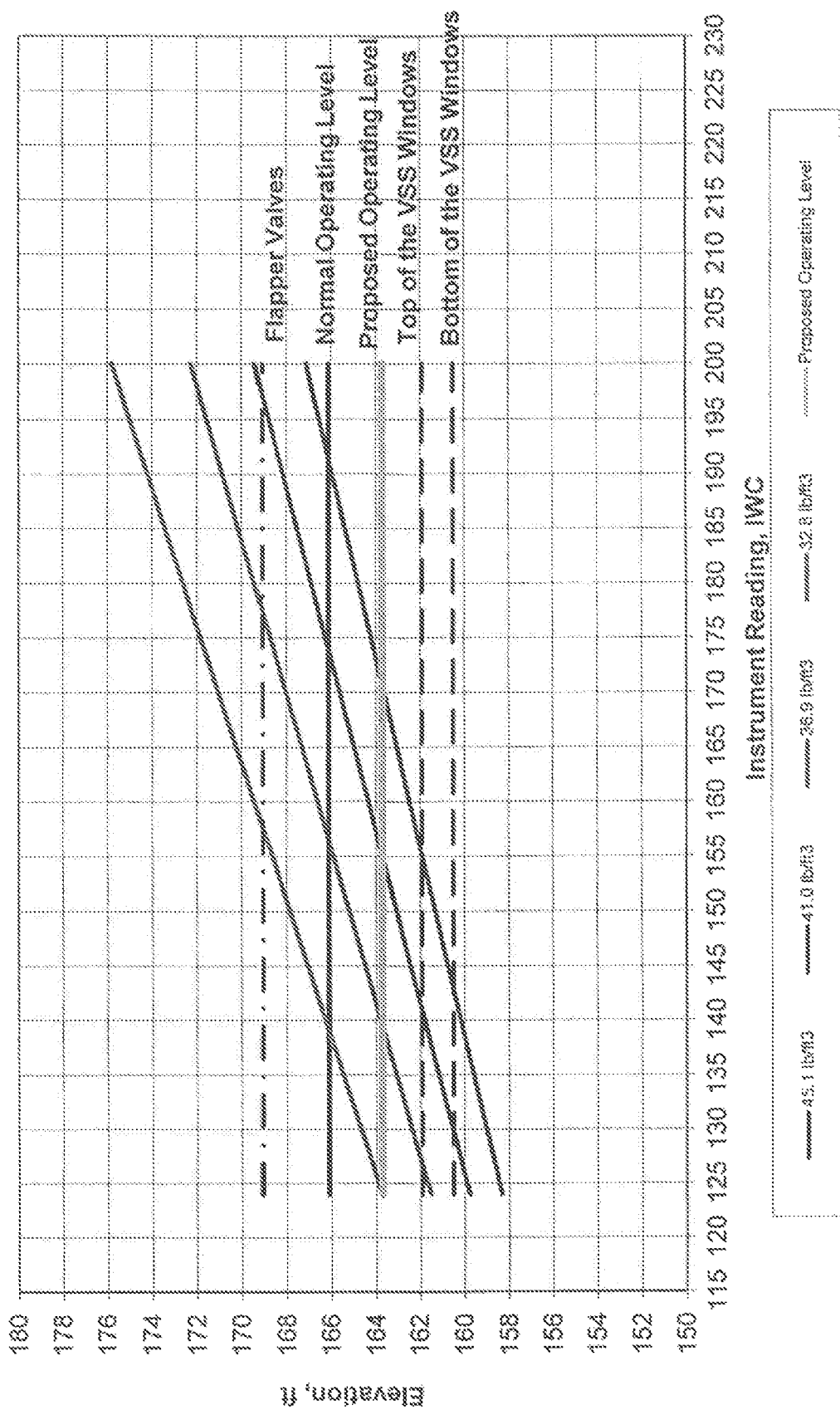
FIG. 6 is a graph of the results of varying the catalyst bed elevation for a variety of fluidized bed density levels for the test runs of FIG. 5.
Figure 7A:
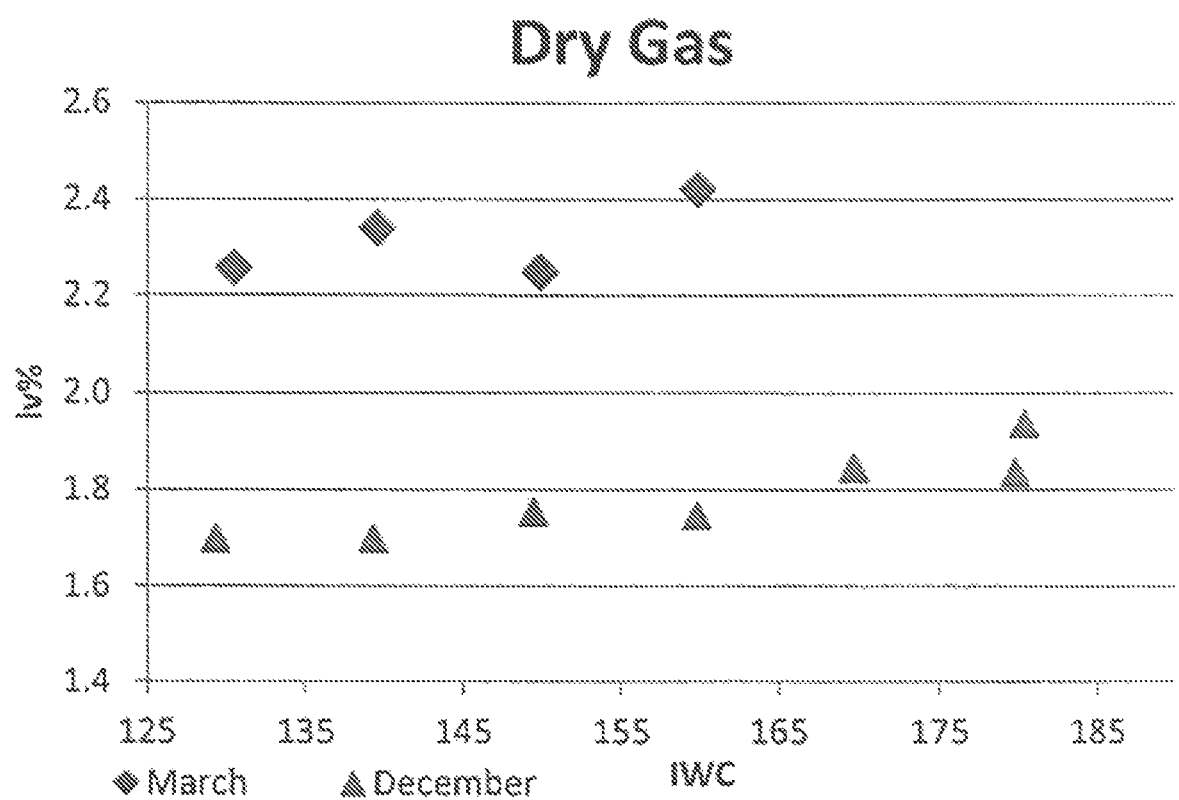
Figure 7B:
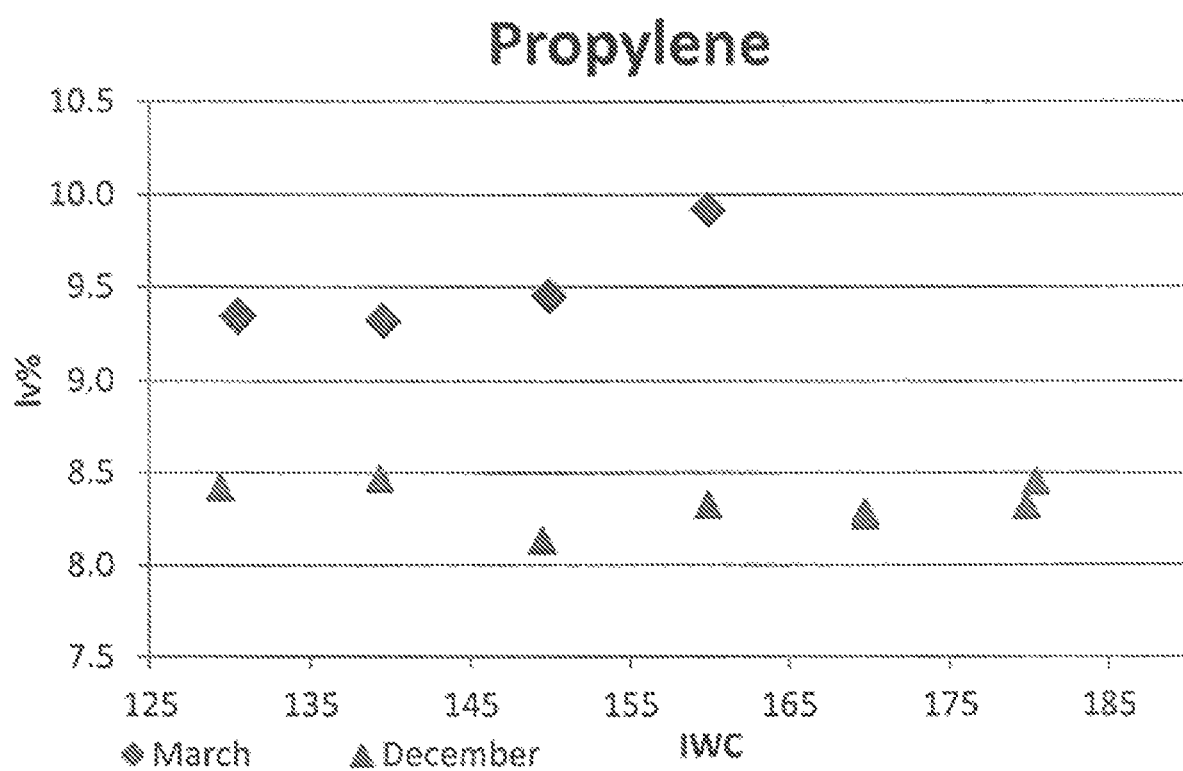
Figure 7C:
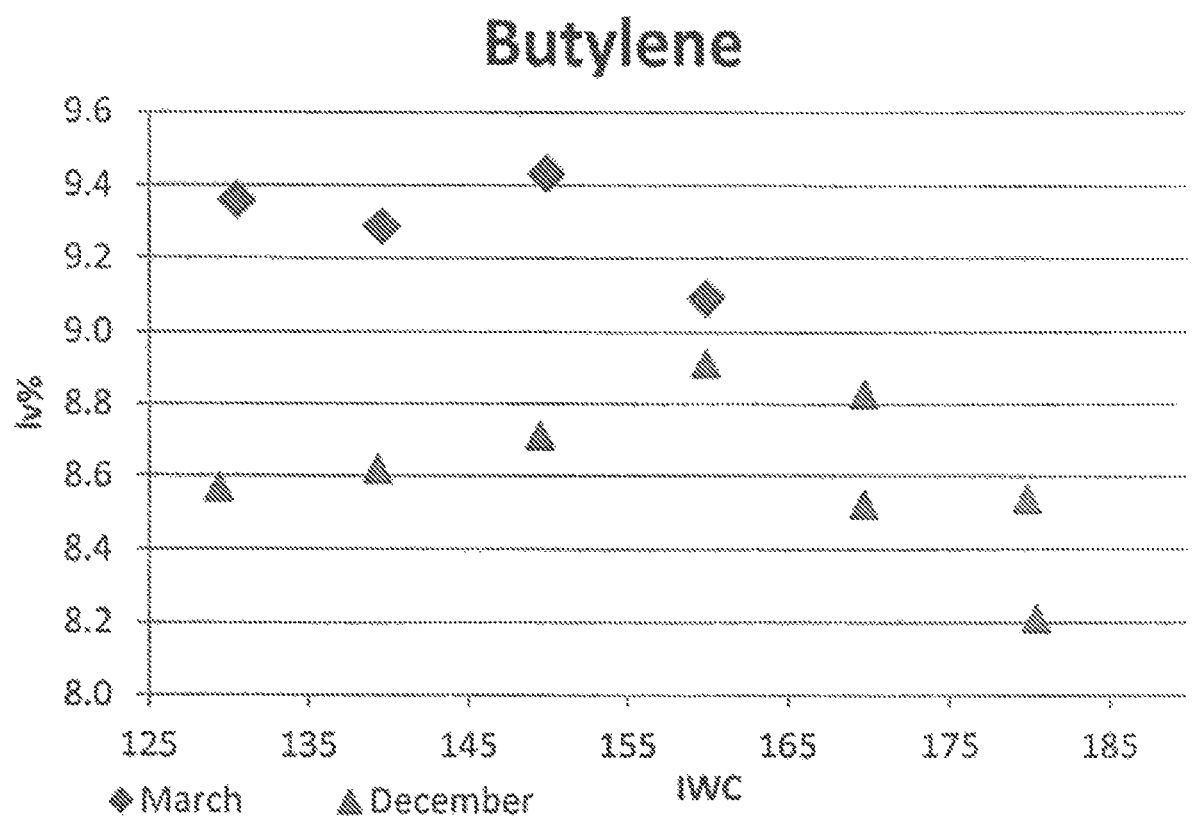
Figure 7D:
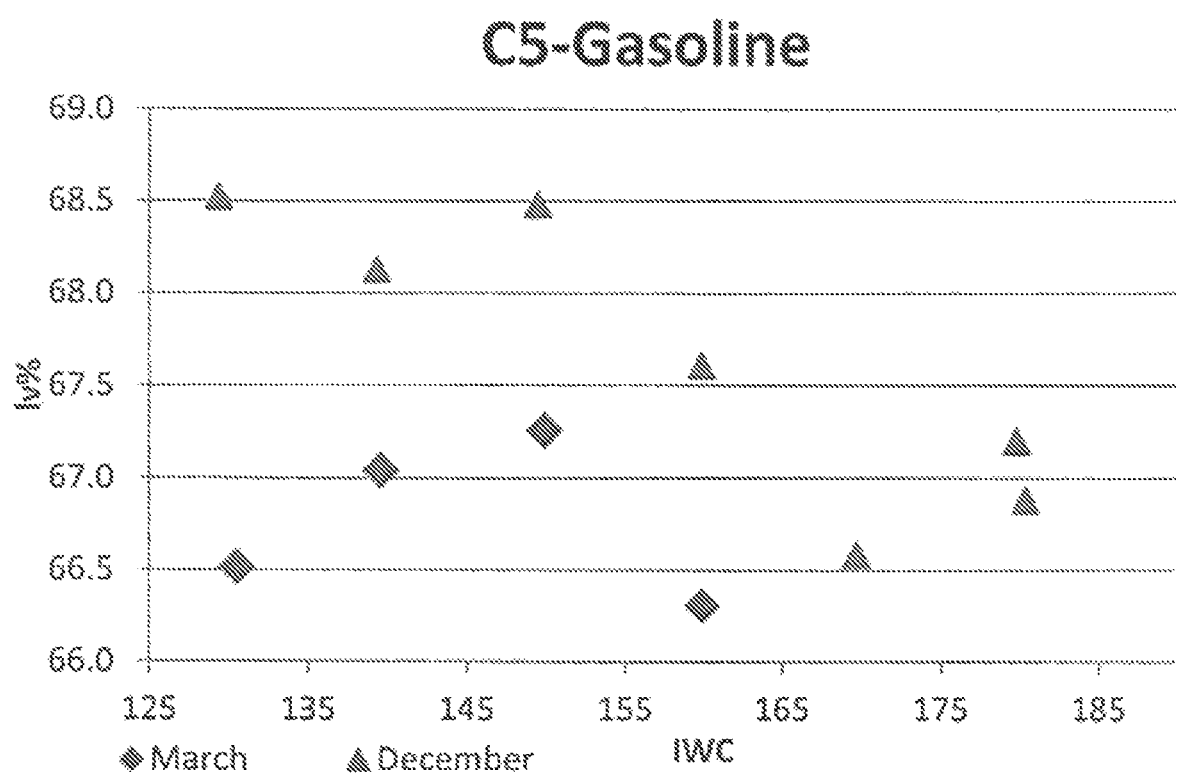
Figure 7E:
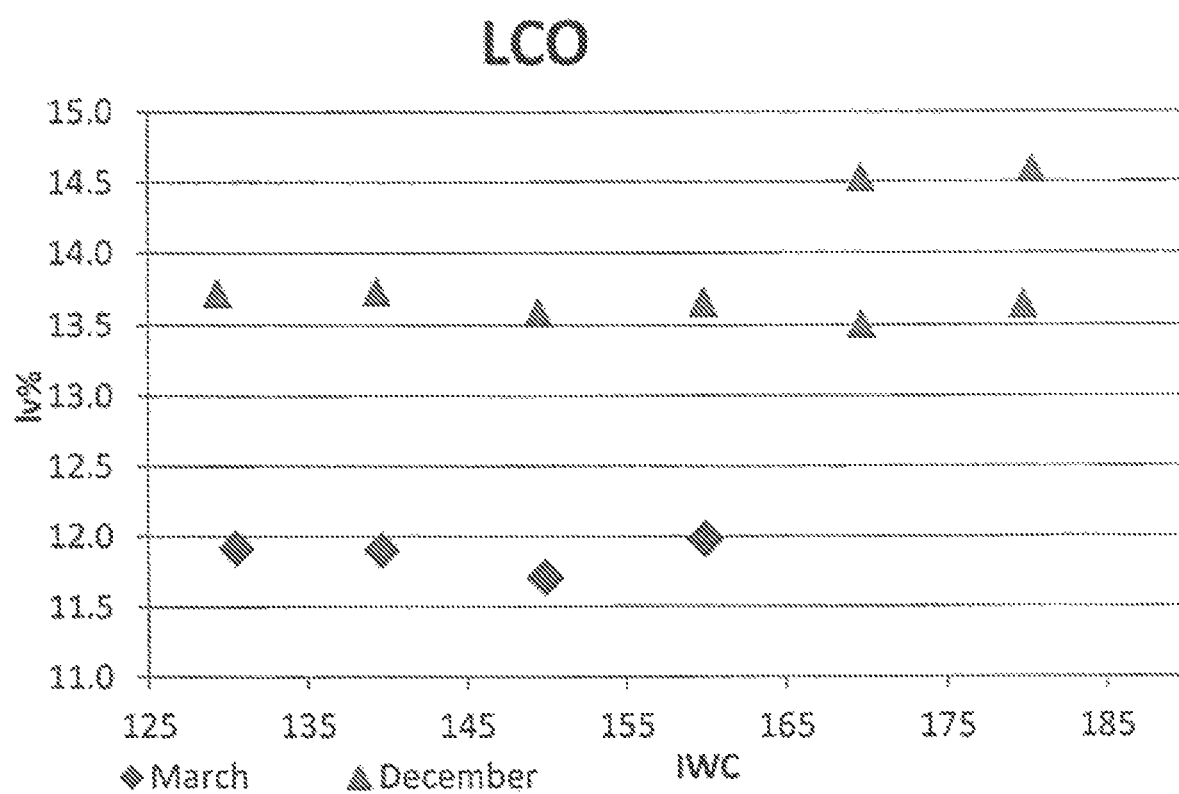
Figure 7F:
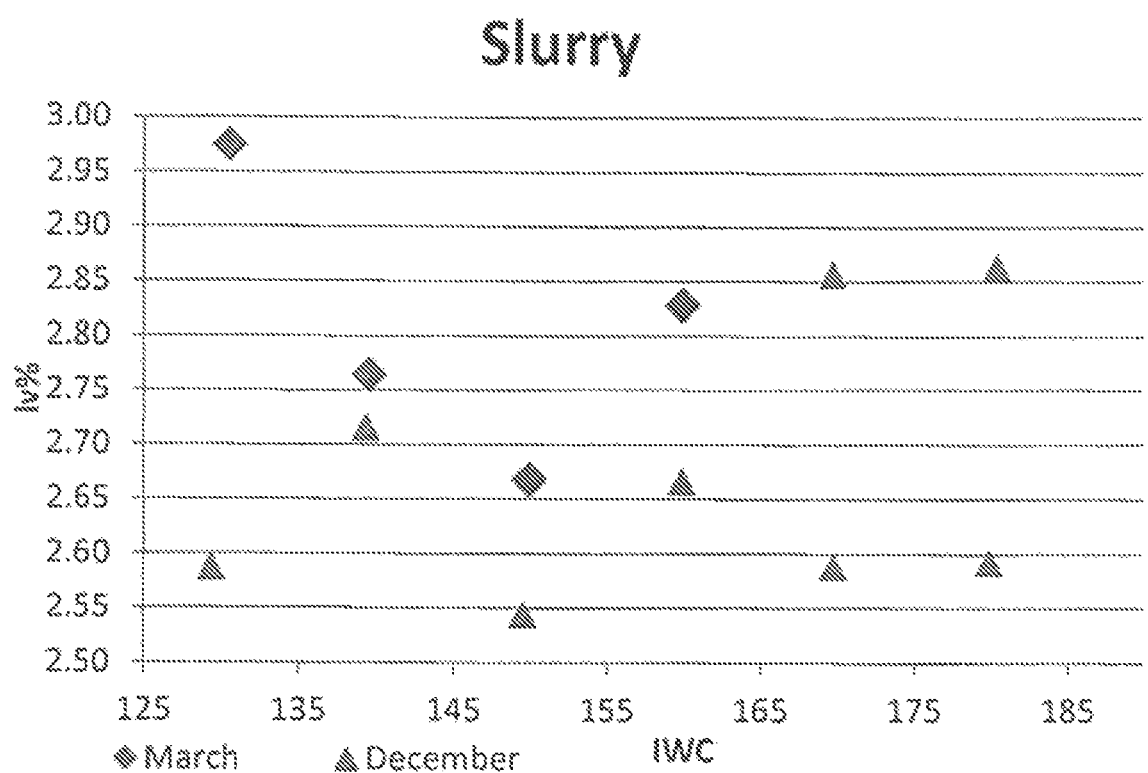
Figure 7G:
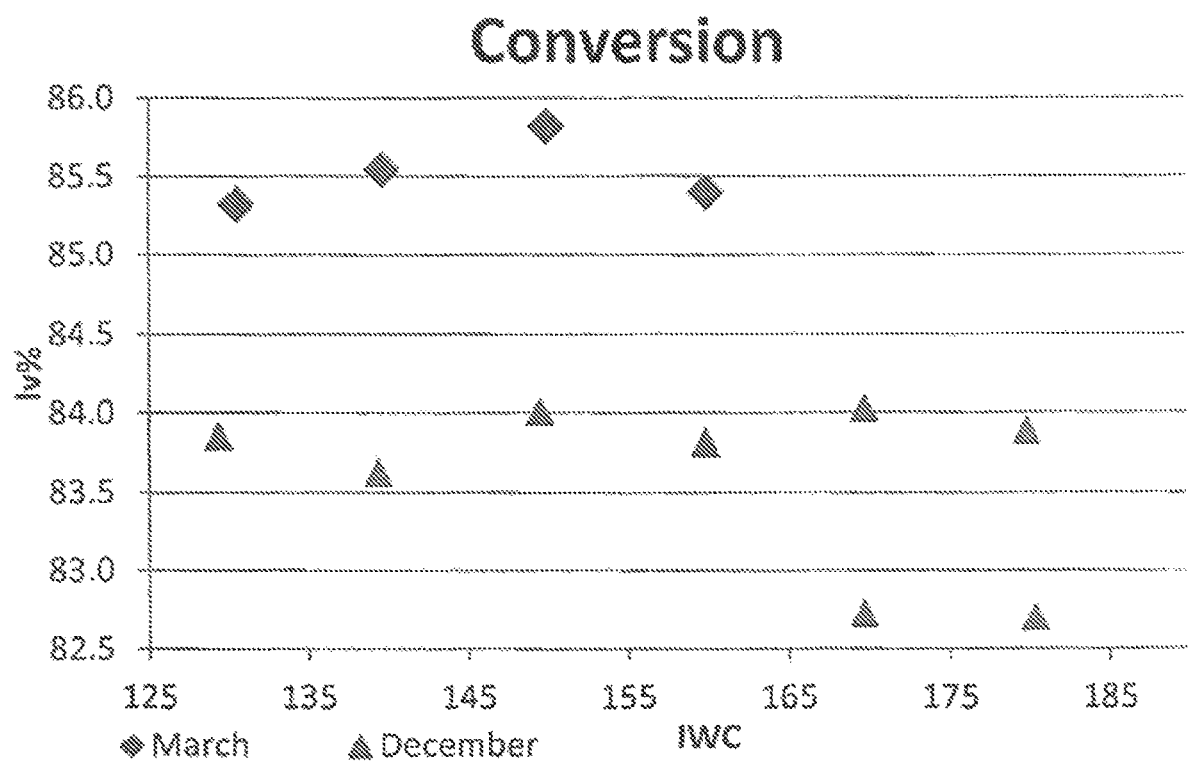
Figure 7H:
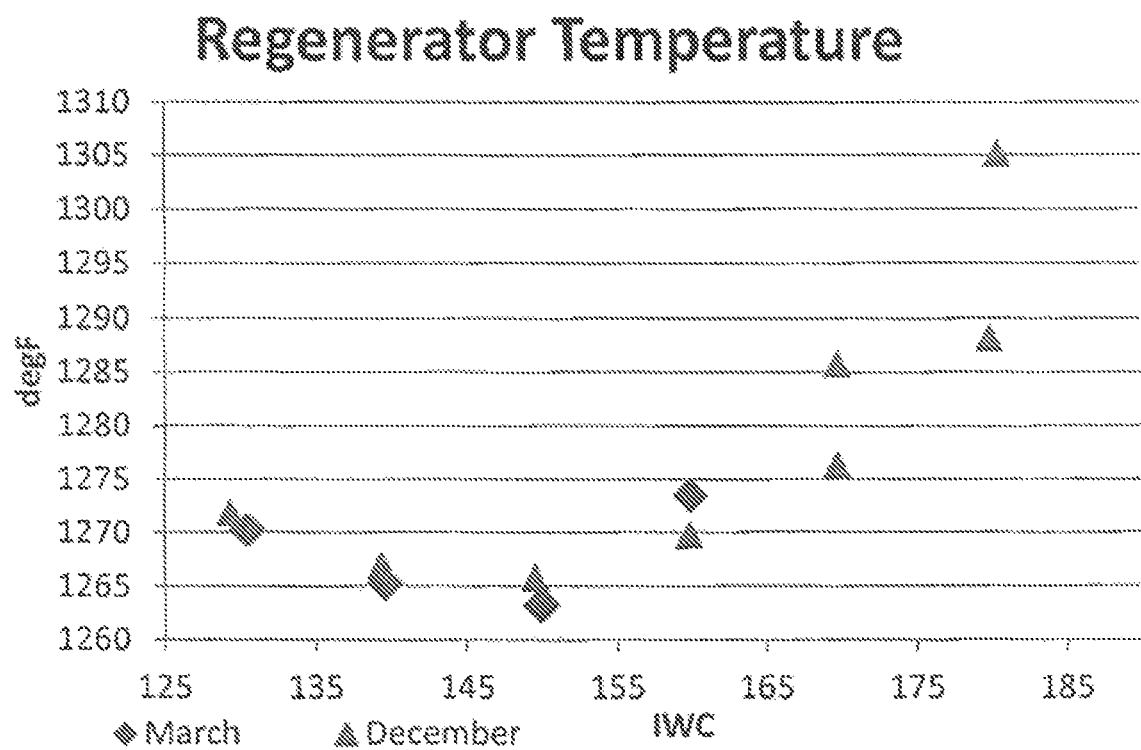
Figure 7I:
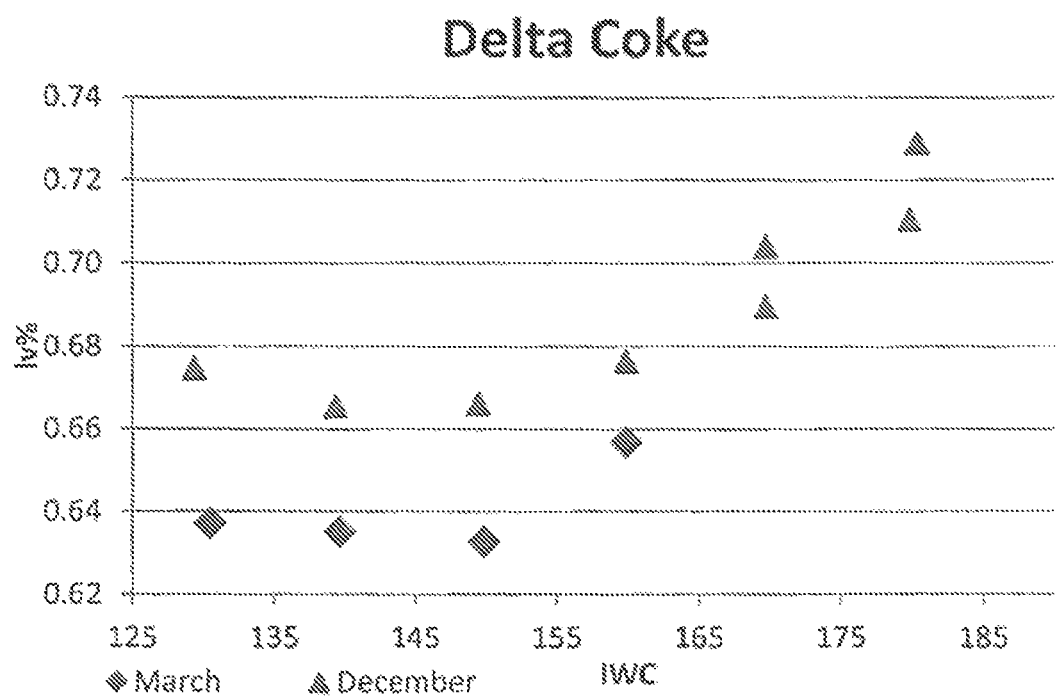

FIG. 6 graphically represents proposed more efficient operating levels for the catalyst bed elevation, using a variety of fluidized bed density levels. The most efficient operating levels range from 125 IWC for the least dense fluidized catalyst to 170 IWC for the most dense fluidized catalyst. The catalyst bed levels are optimally located just above the VSS windows 32.

FIGS. 7*a-i* show the product yield graphs for the tests of FIG. 5. During the first test, the reactor outlet temperature was 970° F. compared with a reactor outlet temperature of 950° F. during the second test. The difference in reactor outlet temperature is the reason for the offsets in the yields shown in FIGS. 7*a-i*. Again, it can be seen that lower catalyst bed levels result in increased yield and decreased temperatures.

Figure 2:
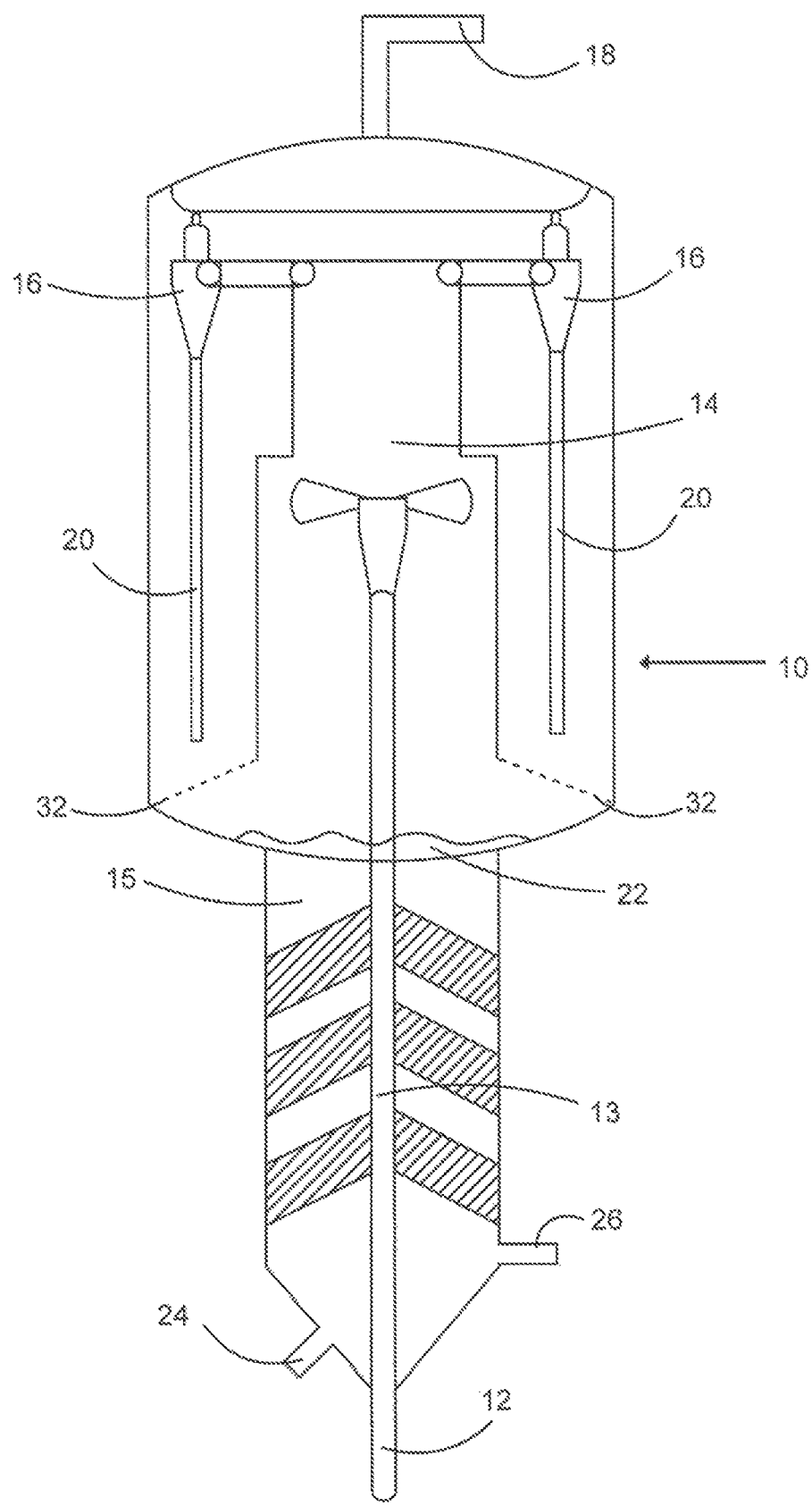
FIG. 2 is a schematic of an FCC reactor incorporating another embodiment of the invention.

Referring now to FIG. 2, the FCC unit is shown having the top level of the catalyst bed 22 located below the windows 32 of the separator 14. Under proper gas flow rates and hydraulic balance, hydrocarbon gases will bypass the separator 14 and exit the reactor, lowering hydrocarbon/catalyst residence time in the separator 14.

Referring now to FIG. 3, the invention provides another alternative structure to assist in the effort to separate clean hydrocarbon gases from the fluidized catalyst efficiently. The alternative structure includes a baffle member 28 positioned immediately under the separator 14. The structure allows for the optimal level for the catalyst bed 22 to be further lowered as shown. Baffle 28 prevents any fluidized catalyst from entering the separation chamber 14. Hydrocarbon gases escape the fluidized bed after residence in the stripper 15 and fluidized bed 22 through vent tubes 30 which carry the clean hydrocarbon gases directly to the upper most region of the separator, allowing those gases to be passed to the cyclones 16.

Another example of a test run of the present invention at a different location and on a different reactor from that as shown in FIG. 5 is shown in FIG. 8. The data shown in FIG. 8 and FIG. 9 proves improved yield selectivities and the dry gas and regenerator temperature shifts associated with lower catalyst inventory. The delta yields for a 26-28% lowered catalyst inventory in the reactor shows significant improvement. In both volume percent and weight percent.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

The invention claimed is:

1. A fluidic catalytic cracker reactor to increase hydrocarbon yield and decrease coke production, the fluidic catalytic cracker reactor comprising:
   a riser that passes a heated mixture of hydrocarbon and catalyst through an outlet thereof;
   a separation chamber having a top portion and a bottom portion, the outlet of the riser being received in the top portion of the separation chamber;
   one or more cyclones in fluid communication with the separation chamber;
   a baffle member positioned proximate the bottom portion of the separation chamber;
   at least one vent tube extending through the baffle member and towards the top portion of the separation chamber; and
   a catalyst bed positioned below the baffle member, the baffle member being configured to reduce fluidized catalyst from entering the separation chamber above the baffle member.

2. The fluidic catalytic cracker reactor of claim 1, wherein the bottom portion of the separation chamber includes at least one chamber window.

3. The fluidic catalytic cracker reactor of claim 2, wherein the baffle member at least partially passes through the at least one chamber window.

4. The fluidic catalytic cracker reactor of claim 1, wherein an operating level of the catalyst bed is from 125 IWC to 170 IWC.

5. The fluidic catalytic cracker reactor of claim 1, wherein an operating level of the catalyst bed is from 130 IWC to 160 IWC.

6. The fluidic catalytic cracker reactor of claim 1, wherein the at least one vent tube to carry carries hydrocarbon gases from the catalyst bed to the top portion of the separation chamber.

7. The fluidic catalytic cracker reactor of claim 1, wherein the at least one vent tube extends from the catalyst bed, through the baffle member, and to the top portion of the separation chamber to carry the hydrocarbon gases therethrough.

8. A fluidic catalytic cracker reactor to increase hydrocarbon yield and decrease coke production, the fluidic catalytic cracker reactor comprising:
 a riser that passes a heated mixture of hydrocarbon and catalyst through an outlet thereof;
 a separation chamber having a top portion and a bottom portion, the outlet of the riser being received in the top portion of the separation chamber, the bottom portion of the separation chamber includes at least one chamber window;
 one or more cyclones in fluid communication with the separation chamber;
 a baffle member positioned proximate the bottom portion of the separation chamber; and
 a catalyst bed positioned below the baffle member, the baffle member being configured to reduce fluidized catalyst from entering the separation chamber above the baffle member, and an operating level of the catalyst bed being in a range from about 125 IWC to about 170 IWC.

9. The fluidic catalytic cracker reactor of claim 8, wherein the baffle member at least partially passes through the at least one chamber window.

10. The fluidic catalytic cracker reactor of claim 8, wherein an operating level of the catalyst bed is from 130 IWC to 160 IWC.

11. The fluidic catalytic cracker reactor of claim 8, further comprising at least one vent tube to carry hydrocarbon gases from the catalyst bed to the top portion of the separation chamber.

12. The fluidic catalytic cracker reactor of claim 8, further comprising at least one vent tube that extends from the catalyst bed, through the baffle member, and to the top portion of the separation chamber to carry the hydrocarbon gases therethrough.

13. A fluidic catalytic cracker reactor to increase hydrocarbon yield and decrease coke production, the fluidic catalytic cracker reactor comprising:
 a riser that passes a heated mixture of hydrocarbon and catalyst through an outlet thereof;
 a separation chamber having a top portion and a bottom portion, the outlet of the riser being received in the top portion of the separation chamber;
 one or more cyclones in fluid communication with the separation chamber;
 a baffle member positioned proximate the bottom portion of the separation chamber;
 a catalyst bed positioned below the baffle member, the baffle member being configured to reduce fluidized catalyst from entering the separation chamber above the baffle member, and an operating level of the catalyst bed being in a range from about 125 IWC to about 170 IWC; and
 at least one vent tube to carry hydrocarbon gases from the catalyst bed to the top portion of the separation chamber.

14. The fluidic catalytic cracker reactor of claim 13, wherein the bottom portion of the separation chamber includes at least one chamber window.

15. The fluidic catalytic cracker reactor of claim 14, wherein the baffle member at least partially passes through the at least one chamber window.

16. The fluidic catalytic cracker reactor of claim 1, wherein an operating level of the catalyst bed is from 130 IWC to 160 IWC.

17. The fluidic catalytic cracker reactor of claim 13, wherein the at least one vent tube extends from the catalyst bed, through the baffle member, and to the top portion of the separation chamber to carry the hydrocarbon gases therethrough.

18. A fluidic catalytic cracker reactor to increase hydrocarbon yield and decrease coke production, the fluidic catalytic cracker reactor comprising:
 a riser that passes a heated mixture of hydrocarbon and catalyst through an outlet thereof;
 a separation chamber having a top portion and a bottom portion, the outlet of the riser being received in the top portion of the separation chamber, the bottom portion of the separation chamber includes at least one chamber window;
 one or more cyclones in fluid communication with the separation chamber;
 a baffle member positioned proximate the bottom portion of the separation chamber and positioned to at least partially pass through the at least one chamber window;
 a catalyst bed positioned below the baffle member, the baffle member being configured to reduce fluidized catalyst from entering the separation chamber above the baffle member; and
 at least one vent tube to carry hydrocarbon gases from the catalyst bed to the top portion of the separation chamber.

19. The fluidic catalytic cracker reactor of claim 18, wherein the at least one vent tube extends from the catalyst bed, through the baffle member, and to the top portion of the separation chamber to carry the hydrocarbon gases therethrough.

20. The fluidic catalytic cracker reactor of claim 19, wherein an operating level of the catalyst bed is from 130 IWC to 160 IWC.

* * * * *